(12) United States Patent
Greer

(10) Patent No.: US 7,261,872 B2
(45) Date of Patent: Aug. 28, 2007

(54) METHOD FOR PRODUCING METAL FLUORIDE MATERIALS

(75) Inventor: F. Conrad Greer, Coppell, TX (US)

(73) Assignee: Platinum Intellectual Property, LP, Dallas, TX (US)

( * ) Notice: Subject to any disclaimer, the term of this patent is extended or adjusted under 35 U.S.C. 154(b) by 587 days.

(21) Appl. No.: 10/662,961

(22) Filed: Sep. 15, 2003

(65) Prior Publication Data

US 2004/0126309 A1 Jul. 1, 2004

Related U.S. Application Data

(60) Provisional application No. 60/421,716, filed on Oct. 28, 2002.

(51) Int. Cl.
   *C01B 9/08* (2006.01)
(52) U.S. Cl. .................. 423/489; 423/493; 502/159; 502/169; 502/151
(58) Field of Classification Search ............... 502/159, 502/169, 151; 423/489, 493
   See application file for complete search history.

(56) References Cited

U.S. PATENT DOCUMENTS

| | | | | |
|---|---|---|---|---|
| 2,167,784 | A | * | 8/1939 | Svendsen .................. 423/633 |
| 2,624,713 | A | * | 1/1953 | Hurley ...................... 502/229 |
| 2,904,398 | A | | 9/1959 | Smith |
| 2,924,508 | A | | 2/1960 | Gilliland et al. |
| 2,952,514 | A | | 9/1960 | Smith |
| 3,097,063 | A | | 7/1963 | Gilliland et al. |
| 3,565,700 | A | | 2/1971 | Root |
| 3,750,911 | A | | 8/1973 | Ebner et al. |
| 4,012,493 | A | * | 3/1977 | Layne et al. ............... 423/489 |
| 4,021,530 | A | | 5/1977 | Layne et al. |
| 4,034,070 | A | | 7/1977 | Wojtowicz et al. |
| 4,545,964 | A | | 10/1985 | Bergez et al. |
| 4,638,444 | A | | 1/1987 | Laragione et al. |
| 4,741,893 | A | | 5/1988 | Watanabe et al. |
| 4,764,056 | A | | 8/1988 | Zentgraf et al. |
| 4,857,294 | A | | 8/1989 | Bridenne Alaux et al. |
| 4,917,872 | A | | 4/1990 | Nakahara et al. |
| 4,938,945 | A | | 7/1990 | Mahmood et al. |
| 4,983,373 | A | | 1/1991 | Withers, Jr. et al. |
| 5,698,483 | A | | 12/1997 | Ong et al. |
| 5,877,128 | A | | 3/1999 | Greer |
| 6,258,758 | B1 | | 7/2001 | Greer |
| 6,316,377 | B1 | | 11/2001 | Fulton et al. |
| 6,362,135 | B1 | | 3/2002 | Greer |
| 6,436,362 | B1 | | 8/2002 | Cuzzato |

FOREIGN PATENT DOCUMENTS

JP  10 287 402  10/1998

OTHER PUBLICATIONS

Babor, J. A., "Basic College Chemistry", Second Edition, 1953 (no month), pp. 255-260.*
Howe-Grant, Mary, "Fluorine Chemistry: A Comprehensive Treatment", John Wiley & Sons, 1995, pp. 115-138.
Parker, Sybil P., "McGraw-Hill Encyclopedia of Chemistry" $2^{nd}$ edition, McGraw-Hill Inc., 1993, pp. 507-508.
Othmer, Kirk, "Concise Encyclopedia of Chemical Technology", John Wiley & Sons, 1985, pp. 501-505.
Lide, David R., "CRC Handbook of Chemistry and Physics, $75^{th}$ Edition", CRC Press, Inc. 1995, pp. 5-1—5-23.
Honeywell, "Hydrofluoric Acid Properties", vol. 1.0, Apr. 2000, pp. 26.
International Search Report, dated Mar. 15, 2004, pp. 3.

* cited by examiner

*Primary Examiner*—Ngoc-Yen Nguyen
(74) *Attorney, Agent, or Firm*—Fulbright & Jaworski LLP

(57) ABSTRACT

A method of producing nano metal fluoride powders comprising the steps of mixing an aqueous or organic continuous phase comprising at least one metal cation salt with a hydrophilic or organic polymeric disperse phase forming a metal cation salt/polymer gel and then treating said gel with anhydrous hydrofluoric acid to convert said metal cation salt to metal cation fluoride and heat treating the gel at a temperature sufficient to drive off water and/or organics within the gel, leaving a residue of nano-size metal fluoride powder.

18 Claims, 1 Drawing Sheet

METHOD FOR PRODUCING METAL FLUORIDE MATERIALS

CROSS-REFERENCE TO RELATED APPLICATIONS

This non-provisional application claims priority to U.S. Provisional Patent Application No. 60/421,716, filed Oct. 28, 2002, entitled METHOD FOR PRODUCING HIGH CATALYTIC ACTIVITY, SUBMICRON, METAL FLUORIDE CATALYST MATERIALS, the disclosure of which is hereby incorporated by reference in its entirety.

TECHNICAL FIELD

The present application relates to the manufacture of metal fluorides to be employed as catalysts or used in any other application.

BACKGROUND

It is known by those skilled in the art that in many instances metal fluorides may be produced by combining a metal or a metal compound (e.g. metal salts) with hydrofluoric acid. Wherein the metal compound is a metal chloride, the reactions are basically as follows:

$$MCl+HF \rightarrow MF+HCl\uparrow$$

$$MCl_2+2HF \rightarrow MF_2+2HCl\uparrow$$

$$MCl_3+3HF \rightarrow MF_3+3HCl\uparrow$$

$$MCl_4+4HF \rightarrow MF_4+4HCl\uparrow$$

The reaction between metal chlorides and hydrofluoric acid may be endothermic. In such cases, in order for the reactions to go to completion, the reactants must absorb heat from their environment. Where the reactions are endothermic, it has been observed that the greater the rate of heat delivery to the reactants and the higher the temperature at the time of the reaction, the smaller are the resultant metal fluoride particles. In general, the smaller the metal fluoride particles, the greater is the exposed surface area per unit of weight of the resultant metal fluoride. In view of the fact that catalysts are surface active agents, the greater surface area per unit of weight commonly associated with the smaller particles would be expected to exhibit greater catalytic activity, and such has been shown to be the case.

In the event the reaction between the metal chloride and the anhydrous hydrofluoric acid is exothermic, the reaction would need to give up heat in order to go to completion. In which case the conclusion cited above would be expected to be the opposite for the exothermic reaction case.

The process of combining metal chlorides and hydrofluoric acid may have somewhat varied results depending on which metal chloride is employed; however, in order to illustrate the general reaction, the specific case of the manufacture of ferric trifluoride by combining ferric trichloride and anhydrous hydrofluoric acid is cited herein.

The process of combining ferric trichloride and anhydrous hydrofluoric acid causes the following events to occur:

The ferric trichloride is dissolved and ionized in the liquid anhydrous hydrofluoric acid.

The individual molecule of dissolved and ionized ferric trichloride exchanges the first chloride atom with a fluoride atom from the liquid, ionized anhydrous hydrofluoric acid source and in so doing, the individual molecular reaction product remains soluble and ionized as $FeFCl_2$, ferric fluoride dichloride along with the evolution of hydrochloric acid gas (at one atmosphere and at temperatures above −84.9° C.).

The individual dissolved and ionized ferric fluoride dichloride exchanges the second and third chloride atoms with two fluoride atoms from the liquid ionized anhydrous hydrofluoric acid source and, in so doing, the ferric trifluoride molecule thus formed becomes insoluble in the liquid anhydrous hydrofluoric acid and precipitates as a lime green solid, while simultaneously liberating additional hydrochloric acid gas.

It is the currently accepted practice to add liquid anhydrous hydrofluoric acid to solid ferric trichloride when manufacturing ferric trifluoride, as is set forth, for example, in detail in U.S. Pat. No. 4,938,945, the disclosure of which is hereby incorporated by reference herein in its entirety. This method is practiced for various reasons cited in U.S. Pat. No. 4,938,945. An additional reason for adding the liquid anhydrous hydrofluoric acid to solid ferric trichloride is safety. It is generally accepted that there is a lower propensity for the reactants to splatter and, hence, this method is deemed to be a safer process than adding the ferric trichloride to the anhydrous hydrofluoric acid. However, it is manifestly obvious that, in this process, the first weight aliquot of ferric trichloride is exposed to a very limited quantity of anhydrous hydrofluoric acid (very low weight ratio of anhydrous hydrofluoric acid to ferric trichloride). Each subsequent aliquot of ferric trichloride is also exposed to a limited weight ratio of anhydrous hydrofluoric acid to ferric trichloride but eventually sufficient anhydrous hydrofluoric acid is added until the perceived optimum weight ratio is established. However, at that point in time all of the ferric trichloride has reacted at a weight ratio of anhydrous hydrofluoric acid to ferric trichloride that is significantly below the optimum level. It is contended that this aspect of the process results in relatively large primary particles, the agglomeration of the primary particles, slow reaction times, incomplete reactions, low to no catalytic activity, and poor quality control with respect to the chemical and physical characteristics of the resultant ferric trifluoride product.

Furthermore, it is the currently accepted practice to combine the ingredients in the ferric trifluoride manufacturing process at atmospheric pressure. In light of the fact that liquid anhydrous hydrofluoric acid boils at 19.8° C. (67.6° F.) at standard atmospheric pressure, the boiling point of the anhydrous hydrofluoric acid limits the temperature to which the environment of the reactants may be elevated prior to and during the reaction. In the absence of temperature controlling apparatus and/or equipment, the prior art manufacturing process will tend to experience cooling while the ingredients are being combined because of the endothermic nature of the reaction. Thereafter, the resultant product will tend to modulate at ambient temperature or at 19.8° C. (67.6° F.), the boiling point of anhydrous hydrofluoric acid at standard atmospheric pressure, if the ambient temperature is greater than 19.8° C. (67.6° F.), once the reaction is complete.

Following the completion of the reaction, it is currently accepted practice to allow the resultant ferric trifluoride product to remain submerged in the liquid anhydrous hydrofluoric acid three to ten days. The longer residence time ("pickling time") generally results in a more complete reaction which in turn yields a more pure ferric trifluoride product.

Following the reaction period and the residence period, it is currently accepted practice to separate the resultant solid ferric trifluoride product from the remaining anhydrous hydrofluoric acid by decanting and/or evaporating the acid. Thereafter, the ferric trifluoride product is dried in stages until the ultimate temperature is approximately 250° F. In so doing, it is anticipated that any free residual anhydrous hydrofluoric acid and/or any free water shall be driven off, leaving an anhydrous ferric fluoride product. The product is then packaged in such a manner as to isolate it from the environment and avoid the absorption of moisture, etc.

SUMMARY OF THE INVENTION

Observations made during or after manufacturing ferric trifluoride, while employing prior art methods, are as follows:

The higher the anhydrous hydrofluoric acid temperature, up to a maximum of 19.8° C. (67.6° F.), the smaller the resultant ferric trifluoride particles.

The greater the weight ratio of anhydrous hydrofluoric acid to ferric trichloride, up to a weight ratio of 60 to 1, the smaller the resultant ferric trifluoride particles.

The longer the reactant product is allowed to reside in the anhydrous hydrofluoric acid environment the more complete is the reaction and, hence, the resultant ferric trifluoride product is more nearly pure.

Stirring or agitation during the addition of the anhydrous hydrofluoric acid to the ferric trichloride appears to result in smaller ferric trifluoride particles, and it clearly reduces the necessary residence time of the ferric trichloride within the anhydrous hydrofluoric acid to cause a complete reaction which produces more nearly pure ferric trifluoride.

The resultant ferric trifluoride product that results in discrete, unagglomerated primary particles in the submicron particle diameter range have proven to exhibit a greater catalytic effect in certain specific reactions wherein PTFE is caused to react with steel and aluminum at ambient temperature and atmospheric pressure. See, for example, U.S. Pat. No. 5,877,128, the disclosure of which is incorporated herein by reference in its entirety. Hence, the smaller submicron ferric trifluoride particles are deemed to constitute a better catalytic product.

These specific catalyst materials must exhibit the following properties and specifications when finished in order to serve the intended purpose.

The catalyst materials must have individual particles no larger than 0.05 microns.

The catalyst materials must not be agglomerated. Each particle must be discrete and must be unattached to every other particle.

The catalyst chemistry must be 99.9% pure and devoid of stray elements and contaminants, including water.

The catalyst material must not exhibit a pH of less than 3.5 when slurried in demineralized water at a weight ratio of 1 gram of material to 10 grams of demineralized water.

The catalyst materials must be active as a catalyst as may be determined by the material's ability to cause a chemical reaction between PTFE (TEFLON®) and steel under specified test conditions.

The ability or tendency of one substance to blend uniformly with another, and the degree to which it blends, is referred to as the "solubility" of one specific substance within the other specific substance. Of particular interest herein is the solubility of certain metal containing solid, solute, substances within certain liquid, solvent, substances. Solubilities of solids within liquids may be found to vary from very little to very large amounts as to their respective solubility in a specific liquid. However, in every case when a solid dissolves in a liquid, the dissolved solid totally looses its former physical attributes such as particle size, crystal structure, hardness, etc. and exists thereafter in the molecular or ionic state, insofar as the solid remains dissolved in the liquid. Molecules and/or ions thus dissolved are in fact fully dispersed to form a true solution.

The process of this invention involves dissolving the soluble metal source ("Metal Source") compound (i.e. metal salts) in a solvent wherein the Metal Source compound is fully dissolved to form a true solution ("Solution"). The Solution is then thoroughly blended with an organic polymer to form a polymeric solution and/or a stable colloidal suspension. In the latter case, the organic polymer, which is characterized as having gelatinous properties, becomes the exterior or dispersing phase and serves to contain and maintain the Solution in suspension. By way of definition, the organic polymer as used herein constitutes a substance in which the Solution is soluble and/or the organic polymer functions as a colloid producing substance in which a disperse phase (Solution) is combined; however, the organic polymer constitutes the continuous phase and serves to produce a gelatinous or viscous combination product. The combined product is referenced to herein as the "Metal Source Polymer." Once prepared, the Metal Source Polymer is introduced into the anhydrous hydrofluoric acid, drop by drop, until the stoichiometric ratio of the gram moles of the Metal Source within the Metal Source Polymer is equal to or less than one half the relevant gram moles of anhydrous hydrofluoric acid.

The Metal Source within the Metal Source Polymer and the anhydrous hydrofluoric acid will react immediately upon contact, and they will react at the molecular and/or ion level to form a metal fluoride reactant product. Because the reaction takes place at the molecular or ionic level, the resultant particles are submicron in size.

Once the Metal Source has reacted with the anhydrous hydrofluoric acid and the metal component of the Metal Source Polymer has been converted to a metal fluoride, the metal fluoride may be separated from the remainder of the materials.

In the event the metal fluoride remains soluble after the reaction, the metal fluoride may be separated from the polymer/solvent by evaporation and/or decomposition of the polymer/solvent mixture.

In the event the metal fluoride becomes insoluble in the polymer/solvent mixture and precipitates out of solution, the solid metal fluoride precipitate may be separated from the liquid by decanting the polymer/solvent off into an appropriately designed separate container or it may be separated by other conventional means such as filtration, etc. The solid metal fluoride resultant product may then be dried slowly in stages up to 100° C. until all volatile materials, including water, have been driven off and, thereafter, the temperature may be raised to the point where the remaining solvent evaporates and/or decomposes and the metal fluoride becomes completely free of the polymer/solvent mixture.

The polymer/solvent/anhydrous hydrofluoric acid material remaining may be separated using well known methods such as distillation, freezing, extraction, decomposition, etc.

Certain Metal Source materials may be found to be insoluble in all of their various compounds (i.e. salts) in all of the practical solvents that would serve to function in the process of this invention. Other Metal Source materials when converted to their various compounds may prove to be soluble only in an aqueous base solvent, as a practical matter.

In the highly unlikely former case cited above, where all of the compounds of the Metal Source are proven to be insoluble in all solvents, the process of this invention is not applicable wherein the Metal Source is of a solid phase and the solvent is of the liquid phase.

In the latter case cited above, the water soluble Metal Source compound should be dissolved in the minimum amount of water and the resultant solution should then be blended with a hydrophilic organic polymer substance such as the group consisting of carbohydrates (i.e. sucrose, starches, cellulose, etc.), carbohydrate derivatives, hydrophilic homopolymers, ethylene glycol polymer, ethylene glycol ester polymer, copolymers of ethylene glycol, Z-hydroxethylene-methacrylates, hydroxyalkylmethacrylates, hydroxyalkylacrylates, acryl-amide, n-vinlypyrrolidone, polyurethanes, polyurethane-acrylic, polyurethane-methacrylic copolymers, animal derived protein-gelatins, etc.

The Metal Source compounds generally found to be water soluble and applicable to the process of this invention include the group consisting of metal chlorides, carbonates, hydroxides, isopropoxides, nitrates, acetates, epoxides, oxalates, and mixtures thereof.

In the present case, the water soluble Metal Source compounds should be dissolved in the minimum amount of water to form a Solution. Then the Solution should be blended with the hydrophilic organic polymer substance in an approximate weight ratio of one to one (1:1), but in any event with a sufficient quantity of hydrophilic organic polymer substance such that the Metal Source compound in the Solution remains dissolved. Thereafter, this mixture of Solution and the hydrophilic organic polymer substance should be blended with anhydrous hydrofluoric acid. This combination is preferably effected by introducing the Solution in the anhydrous hydrofluoric acid very slowly, drop by drop, in an appropriately designed reaction vessel until the stoichiometric ratio of the gram moles of the Metal Source within the Metal Source Polymer is equal to or less than one half the relevant gram moles of anhydrous hydrofluoric acid. In one embodiment, the stoichiometric ratio is between one half and one sixtieth of the relevant gram moles of anhydrous hydrofluoric acid.

Notwithstanding the fact that the Metal Source compound may be soluble in water, it may prove to be desirable to use some other solvent instead of water in that the introduction of water may unavoidably lead to a hydrated resultant product, which may be undesirable.

It is an object of this invention to produce metal fluorides with discrete, nonagglomerated submicron size particles.

It is an object of this invention to produce metal fluorides without introducing impurities into the resultant product.

It is an object of this invention to produce metal fluorides that are chemically pure and physically uniform.

It is an object of this invention to provide a generic, low cost method for producing high purity, submicron, nonagglomerated, discrete particles chemically pure, composed of single or multiple-component metal fluorides.

It is an object of this invention to provide a process for producing high purity, submicron, nonagglomerated, discrete particles of chemically pure, single or multiple-component metal fluorides which do not require highly specialized, controlled atmosphere in the process.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

DETAILED DESCRIPTION

Figure 1:
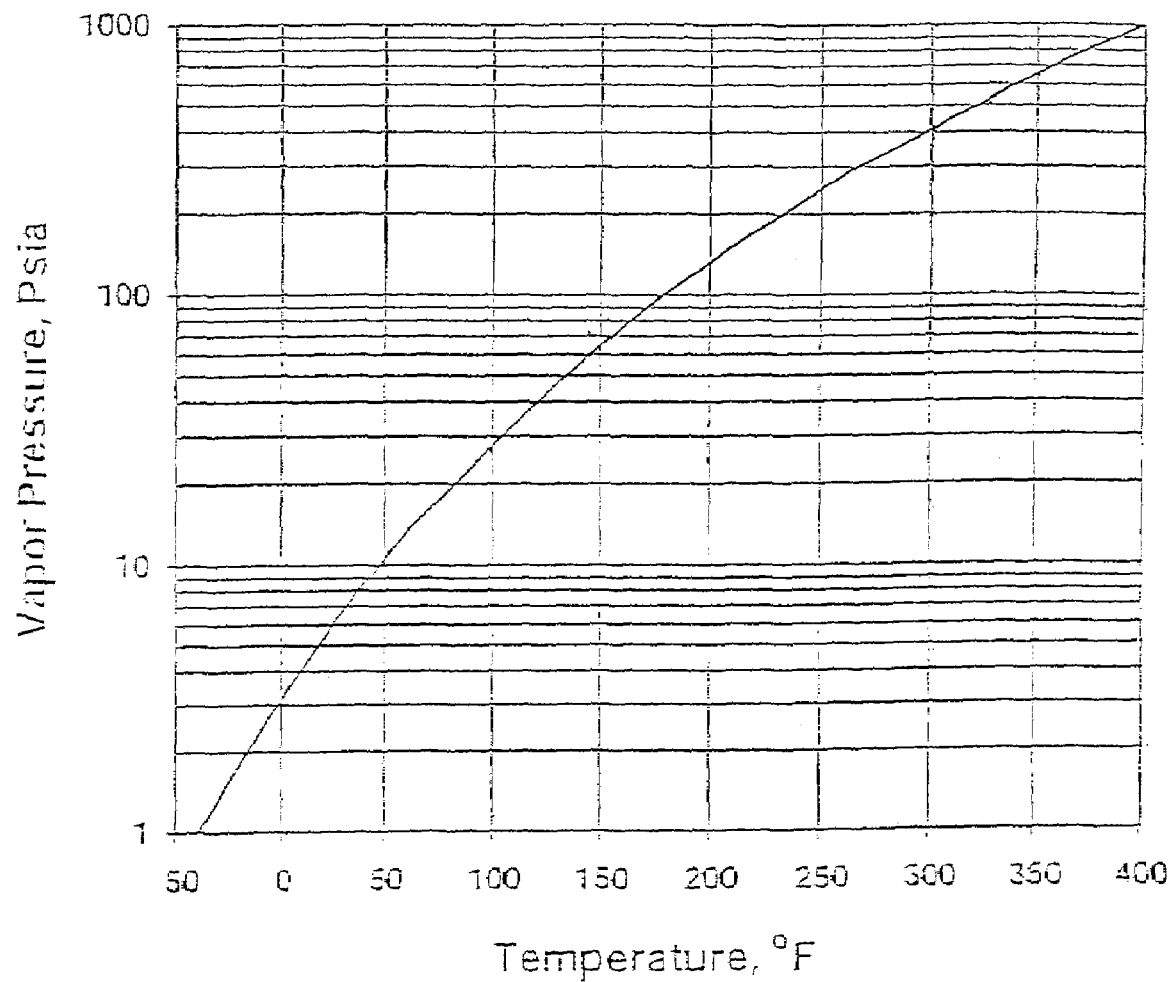
FIG. 1 is a graph illustrating the relationship between vapor pressure and temperature for anhydrous hydrofluoric acid.

Although the metal fluorides produced in the exemplary embodiments disclosed herein are useful as catalysts, the present invention is not limited to producing metal fluoride catalysts. Instead, the metal fluorides produced in accordance with the present invention may be used in virtually any application.

The previously stated observations, made with respect to repeated experiments involving what is labeled the "State of the Art" process herein, have resulted in a number of important conclusions which dictate the important requirements to improve the "State of the Art" process, which are enumerated as follows:

Higher Reaction Temperature: Elevating the temperature at which the reaction between ferric trichloride and anhydrous hydrofluoric acid takes place shall result in smaller diameter particles of the resultant ferric trifluoride product. The means by which a high temperature reaction may be achieved are as follows:

Heating Under Pressure: By creating a pressure resistant reactor vessel made of nickel, nickel alloy, or other metals completely lined with PTFE or other polymers that can withstand the rigors of exposure to anhydrous hydrofluoric acid at the rated reactor operating temperatures and pressures, the temperature of the anhydrous hydrofluoric acid could be elevated to the boiling point of the acid at the pressure rating of the reactor vessel without loss of the hydrofluoric acid through evaporation. The reactor vessel would logically need to be equipped with a pressure relief valve both for safety purposes and to allow the hydrochloric acid gas generated during the reaction to escape.

Preheat: The reactants, anhydrous hydrofluoric acid and ferric trichloride, could be preheated prior to being combined. For example, the anhydrous hydrofluoric acid could be preheated up to the point where the vapor pressure of the acid equaled the working pressure of the reactor vessel. See, for example, the relationship between vapor pressure and temperature for anhydrous hydrofluoric acid as illustrated in FIG. 1. Similarly, the ferric trichloride could be preheated up to approximately 300° C. prior to combining it with the anhydrous hydrofluoric acid. (Note: ferric trichloride has a melting point of 306° C. and a boiling point of 319° C.; however, it begins to decompose at or slightly below its melting point of 306° C.)

Continuous Heating by Various Means: In the event the reactor vessel is made of PTFE or some other anhydrous hydrofluoric acid resistant polymer and not made of metal, it may be continuously heated using microwave energy insofar as the pressure rating of the vessel is not exceeded through such heating operation. It is important to point out that microwave heating may result in vapor bubbles being formed beneath the surface of the liquid anhydrous hydrofluoric acid and such bubbles could burst to the surface resulting in a serious safety hazard. In the event the reactor vessel is made of metal, it may be continuously heated by more conventional means such as electrical resistance, electrical induction, flame or steam. In addition, some heating and mixing may be achieved by imposing high energy ultrasound on the reactor vessel.

High Weight Ratio of Anhydrous Hydrofluoric Acid to Ferric Trichloride: Maintaining a high weight ratio (i.e. up to 60 to 1) of anhydrous hydrofluoric acid to ferric trichloride shall result in smaller diameter particles of the resultant ferric trifluoride product, shall result in a faster and more complete reaction and shall result in a more nearly pure reaction product. The means by which a high weight ratio of the reactants may be achieved are as follows:

Add the Solid Ferric Trichloride to the Liquid Anhydrous Hydrofluoric Acid: It is known that the reaction between anhydrous hydrofluoric acid and ferric fluoride takes place in discernable steps, but the entire reaction takes place in an instant. The degree to which the reaction goes to completion, forming a relatively pure end product, is dependent upon the weight ratio of the reactants and the amount of residence time. In a batch manufacturing process, the ratio of anhydrous hydrofluoric acid to ferric trichloride may be maintained at the optimum value, if the solid ferric trichloride is added to the liquid anhydrous hydrofluoric acid in an enclosed reactor vessel, enclosed for safety, to permit ease of mixing, to retain pressure and to permit heating above the atmospheric boiling point of the anhydrous hydrofluoric acid.

For each weight aliquot of the solid ferric trifluoride that is added to the liquid anhydrous hydrofluoric acid the weight ratio of the reactant will be the most favorable possible for the quantities of the two reactants being employed. This is so, because as each weight aliquot of the ferric trifluoride is introduced into the reactor vessel containing the anhydrous hydrofluoric acid, the reaction shall take place in an instant and the resultant product, ferric trifluoride, shall precipitate and gravitate to the bottom of the reactor vessel. In this process, only a relatively small fraction of the anhydrous hydrofluoric acid shall be consumed. Therefore, when the next weight aliquot of the ferric trichloride is introduced into the reactor vessel, it will encounter approximately the same weight ratio of anhydrous hydrofluoric acid to ferric trichloride, as did the initial aliquot of ferric trichloride. If the process is commenced with an initial weight ratio of 60 to 1, anhydrous hydrofluoric acid to ferric trichloride, the last of ten aliquots of ferric trichloride shall encounter a weight ratio of no less than 56 to 1.

The chemical reaction that takes place when ferric trichloride is combined with anhydrous hydrofluoric acid is set forth below, wherein the stoichiometric combining weight of each compound in the reaction is cited below each such compound, as follows:

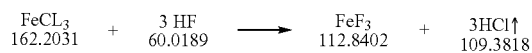

Presupposing one gram mole or 162.2031 grams of ferric trichloride were to be combined with a quantity of anhydrous hydrofluoric acid in a weight ratio of sixty (60) parts anhydrous hydrofluoric acid to one (1) part ferric trichloride. The first aliquot of one gram mole or 162.2031 grams of ferric trichloride would be introduced into 9,732.1860 grams of anhydrous hydrofluoric acid (60:1 weight ratio). The reaction would result in the consumption of 60.0189 grams of anhydrous hydrofluoric acid leaving 9,672.1671 grams of acid unreacted.

The second aliquot of one gram mole or 162.2031 grams of ferric trichloride would be introduced into the remaining 9,672.1671 grams of anhydrous hydrofluoric acid to cause a reaction and the consumption of an additional 60.0189 grams of anhydrous hydrofluoric acid, leaving 9,612.1482 grams of acid unreacted. The combining ratio with the addition of the second aliquot would be 59.63 to 1, anhydrous hydrofluoric acid to ferric trichloride.

Similarly, the combining ratios for the first ten aliquots of one gram mole each of 162.2031 grams of ferric trichloride ($FeCl_3$) introduced into the initial quantity (9,672.1671 grams) of anhydrous hydrofluoric acid ("AHF") is as follows:

| $FeCl_3$ Aliquot No. | AHF Grams Remaining | Weight Ratio of AHF to $FeCl_3$ |
|---|---|---|
| 1 | 9,732.1860 | 60.0000 to 1 |
| 2 | 9,612.1482 | 59.2600 to 1 |
| 3 | 9,552.1293 | 58.8899 to 1 |
| 4 | 9,492.1104 | 58.5199 to 1 |
| 5 | 9,432.0915 | 58.1499 to 1 |
| 6 | 9,372.0726 | 57.7780 to 1 |
| 7 | 9,312.0537 | 57.4098 to 1 |
| 8 | 9,252.0348 | 57.0398 to 1 |
| 9 | 9,192.0159 | 56.6698 to 1 |
| 10 | 9,131.9970 | 56.2998 to 1 |

Following this hypothetical ten step reaction process, the remaining anhydrous hydrofluoric acid could be salvaged, and used again.

Add Proportionate Quantities of Anhydrous Hydrofluoric Acid During the Process: Once the optimum weight ratio of anhydrous hydrofluoric acid to ferric trichloride has been clearly established, it may be recommendable to add anhydrous hydrofluoric acid to the reactor vessel at the optimum stoichiometric weight ratio, prior to the addition of the next aliquot of ferric trichloride, depending of course on how critical the optimum weight ratio proves to be for the specific reaction.

Lone Residence Time: Long residence time should not be required. As was stated earlier, the reaction between the ferric trichloride and the anhydrous hydrofluoric acid takes place in an instant. The manner in which the reaction process is conducted using currently accepted practices results in the need for long residence time in order for the reaction to go to completion. It is concluded that elevating the reaction temperature, maintaining the optimum anhydrous hydrofluoric acid to ferric trichloride weight ratio, and adequate agitation and/or stirring will result in a complete reaction with submicron, nonagglomerated particles of ferric trifluoride that are catalytically active without exposing the reactants to long residence times.

Stirring or Agitation: Stirring or agitation has been concluded to be beneficial to the subject process. Stirring and agitation may be accomplished in the following ways:

Rotation: The reactor vessel may be supported in such a manner as to allow it to be rotated during the period of the reaction.

Ultrasound: Irrespective of the materials of which the reactor vessel is constructed, the ingredients of the vessel may be agitated using a high-energy ultrasound source. The ultrasound, to a lesser degree, will serve to add heat to the vessel as well.

Magnetic Stirring Device: The reactor vessel could be stirred with a magnetic stirring device.

Conventional Stirring Device: The reactor vessel could be stirred with a conventional stirring device employing an electric motor and one or more rotating paddles (e.g. Lightening Mixer) introduced through a pressure packing gland.

Catalytic Activity: Based on the aforementioned observations, it is contended that if the above tabulated recommendations are invoked and followed, the resultant ferric trifluoride product will not only be composed of discrete, nonagglomerated submicron particles, but it shall also exhibit catalytic activity with respect to the test conditions recited herein.

Methods for producing metal fluoride catalysts are disclosed in U.S. Provisional Patent Application No. 60/421,716, filed Oct. 28, 2002, entitled "METHOD FOR PRODUCING HIGH CATALYTIC ACTIVITY, SUBMICRON, METAL FLUORIDE CATALYST MATERIALS," and in co-pending, contemporaneously filed, U.S. patent application Ser. No. 10/661,375, filed Sep. 12, 2003, entitled "PROCESS FOR THE PRODUCTION OF METAL FLUORIDE MATERIALS," the disclosures of which are hereby incorporated by reference herein in their entireties. The present invention provides another method to produce metal fluoride catalyst materials that are of submicron size and that have high catalytic activity. The invention also provides inherently better quality control and provides a reactant product with consistent chemical and physical properties.

Preferred embodiments of the invention are discussed in additional detail below. These methods may be used to produce metal fluoride catalyst materials that are of submicron size and exhibit high catalytic activity. The methods provide inherently better quality control and provides a reactant product with consistent chemical and physical properties as compared with prior art methods.

Case 1 (Organic Solvent):

Essentially chemically pure anhydrous ferric trichloride is dissolved in one or more of the group of solvents consisting of water, alcohol, ether, benzene, acetone, etc., in which group of solvents, ferric trichloride is soluble. Whereas ferric trichloride is soluble in water, water is not a viable solvent for the present invention when the end product is going to be used as a catalyst because the resulting end product is likely to be a hydrated form of the metal fluoride being sought. The hydrated form of metal fluorides generally are not found to be catalytically active.

The dissolving operation may take place at barometric pressure and at ambient temperature, but extraordinary care should be exercised to prevent the hydration of the ferric trichloride prior to dissolving it in the solvent. A sufficient quantity of ferric trichloride should be dissolved to essentially saturate the solvent with the ferric trichloride, bearing in mind that the subsequent operation wherein the mixture of ferric trichloride, solvent and polymer shall be combined with anhydrous hydrofluoric acid and the resultant reaction between the Metal Source (ferric trichloride) and the anhydrous hydrofluoric acid shall be endothermic. This reaction shall result in a significant reduction in temperature, if heat is not added to the system at a rate sufficient to offset the absorption of heat in the reaction. If the mixture or system of materials is allowed to cool, it is likely that the ferric trichloride may drop out of solution before it is reacted. This is because the solubility of ferric trichloride within the solvent is a function of temperature and generally the ferric trichloride will be less soluble at the lower temperature.

For this reason, the solubility of the ferric trichloride in the specific solvent should be tested and measured at the lowest temperature expected to occur during the entire process (e.g. 0° C.). The solubility of the ferric trichloride should then be established, preferably as x grams per y grams of solvent and this established weight ratio of ferric trichloride to solvent should be employed at the outset.

The ferric trichloride/solvent solution should then be blended with a polymer.

In this Case 1, methanol is employed as the solvent and the requisite quantity of ferric trichloride is dissolved in the methanol solvent.

Thereafter, the ferric trichloride/methanol solution is combined with a polymer. In this Case 1, the polymer is polyethylene glycol. Sufficient polyethylene glycol (e.g. Dow Chemical Grade 4500 polyethylene glycol powder) is added to the ferric trichloride/methanol mixture to fully dissolve and/or encapsulate the ferric trichloride/methanol mixture. The combination of these ingredients requires vigorous mixing until the system of ingredients appears to be clear, uniform and is stable.

Next, the above cited mixture is added to an appropriate vessel containing anhydrous hydrofluoric acid. The addition takes place slowly, drop by drop, until the stoichiometric ratio of the gram moles of the ferric trichloride within the mixture is equal to or less than one half the relevant gram moles of anhydrous hydrofluoric acid. The addition of the mixture in this step of Case 1 is accompanied by vigorous stirring.

Once the ferric trichloride has reacted with the anhydrous hydrofluoric acid and has been converted to ferric trifluoride, the ferric trifluoride is separated from the remainder of the materials.

The separated ferric trifluoride material is then dried slowly in stages, up to 100° C., until all of the volatile materials, including any moisture that may have been included, have been driven off and thereafter the temperature is raised to 240° C., to the point where the remaining solvent and polymer evaporate and/or decompose and the ferric trifluoride becomes completely free from all of the solvent and/or the polymer.

The finished product is placed in containers that serve to keep the ferric trifluoride from becoming hydrated.

The resultant anhydrous ferric trifluoride product is essentially chemically pure and exhibits discrete, nonagglomerated, uniform particles with a mean particle size in the order of 0.2 micron and a surface area in the order of 150 square meters per gram. Furthermore, the resultant ferric trifluoride product exhibits a pH of between 4.0 and 7.0 when one gram of the ferric trifluoride is mixed with 10 grams of demineralized water and the relatively high surface area lends to a much higher level of catalytic activity per unit of weight, than ferric trifluoride manufactured by most known other processes.

Case 2 (Water Solvent):

Dissolve 530 grams of essentially chemically pure catalyst grade ferric trichloride in 100 ml of distilled warm water. Combine this salt solution with 20 grams of Dow Chemical Grade 4500 polyethylene glycol powder and stir until the mixture is a clear solution.

Next, the above cited mixture is added to an appropriately designed vessel containing anhydrous hydrofluoric acid. This takes place slowly, drop by drop until the stoichiometric ratio of the gram moles of ferric trichloride within the mixture is equal to or less than one half the relevant gram moles of anhydrous hydrofluoric acid. The addition of the mixture in this step of Case 2 is accompanied by vigorous stirring.

Once the ferric trichloride has reacted with the anhydrous hydrofluoric acid and has been converted to ferric trifluoride, the ferric trifluoride is separated from the remainder of the materials.

The separated ferric trifluoride material is then dried slowly in stages, up to 100° C., until all of the volatile materials, including any moisture that may have been included, have been driven off and thereafter the temperature is raised to 240° C., to the point where the remaining solvent and polymer evaporate and/or decompose and the ferric trifluoride becomes completely free from all of the solvent and/or the polymer.

The finished product is placed in containers that serve to keep the ferric trifluoride from becoming hydrated.

The resultant anhydrous ferric trifluoride product is essentially chemically pure and exhibits discrete, nonagglomerated, uniform particles with a mean particle size in the order of 0.2 micron and a surface area in the order of 150 square meters per gram. Furthermore, the resultant ferric trifluoride product exhibits a pH of between 4.0 and 7.0 when one gram of the ferric trifluoride is mixed with 10 grams of demineralized water and the relatively high surface area lends to a much higher level of catalytic activity per unit of weight, than ferric trifluoride manufactured by most known other processes.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
dissolving anhydrous ferric trichloride in a solvent to create a ferric trichloride/solvent solution;
blending the ferric trichloride/solvent solution with a polymer to create a mixture;
adding the mixture to anhydrous hydrofluoric acid thereby converting the ferric trichloride to ferric trifluoride;
separating the ferric trifluoride; and
drying the ferric trifluoride.

2. The method of claim 1 wherein the anhydrous ferric trichloride is essentially chemically pure.

3. The method of claim 1 wherein the solvent comprises one or more of alcohol, methanol, ether, benzene, or acetone.

4. The method of claim 1 wherein a sufficient quantity of ferric trichloride is dissolved to essentially saturate the solvent with the ferric trichloride.

5. The method of claim 1 wherein the polymer is polyethylene glycol.

6. The method of claim 1 further comprising:
mixing the ferric trichloride/solvent solution and the polymer until the mixture is clear, uniform and stable.

7. The method of claim 1 wherein the adding step further comprises stirring.

8. The method of claim 1 wherein the adding step further comprises:
adding the mixture to anhydrous hydrofluoric acid until the stoichiometric ratio of the gram moles of the ferric trichloride within the mixture is between one half and one sixtieth of the relevant gram moles of anhydrous hydrofluoric acid.

9. The method of claim 1 wherein the ferric trifluoride is dried slowly in stages, up to 100° C., until all moisture has been driven off and thereafter the temperature is raised to 240° C.

10. The method of claim 9 wherein any remaining solvent and polymer evaporates at high temperature thereby freeing the ferric trifluoride of the solvent and/or the polymer.

11. The method of claim 1 further comprising:
placing dried ferric trifluoride in containers that prevent the ferric trifluoride from becoming hydrated.

12. The method of claim 1 wherein the dried ferric trifluoride product is anhydrous, essentially chemically pure and exhibits discrete, nonagglomerated, uniform particles with a mean particle size in the order of 0.2 micron and a surface area in the order of 150 square meters per gram.

13. The method of claim 1 wherein the dried ferric trifluoride product exhibits a pH of between 4.0 and 7.0 when one gram of the dried ferric trifluoride is mixed with 10 grams of demineralized water.

14. A method comprising:
dissolving ferric trichloride in distilled warm water to form a salt solution;
combining the salt solution with polyethylene glycol powder to form a mixture;
stirring the mixture until the mixture is a clear solution;
adding the mixture to anhydrous hydrofluoric acid, thereby allowing the ferric trichloride to react with the anhydrous hydrofluoric acid and to convert to ferric trifluoride;
separating the ferric trifluoride; and
drying the separated ferric trifluoride.

15. The method of claim 14 wherein the mixture is added to the anhydrous hydrofluoric acid drop by drop until the stoichiometric ratio of the gram moles of ferric trichloride within the mixture is equal to or less than one half the relevant gram moles of anhydrous hydrofluoric acid.

16. The method of claim 14 wherein the adding step is accompanied by stirring.

17. The method of claim 14 wherein the separated ferric trifluoride material is dried slowly in stages, up to 100° C., until all volatile materials have been driven off, and thereafter the temperature is raised to the point where remaining solvents and polymers evaporate and/or decompose so that the ferric trifluoride becomes completely free from all of the solvent and/or the polymer.

18. The method of claim 14 further comprising:
placing dried ferric trichloride in containers to keep the ferric trifluoride from becoming hydrated.

* * * * *